(12) United States Patent  (10) Patent No.: US 7,557,476 B2
Brock  (45) Date of Patent: Jul. 7, 2009

(54) HOLLOW CORE ELECTRIC MOTOR

(75) Inventor: Keith M. Brock, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 445 days.

(21) Appl. No.: 11/277,748

(22) Filed: Mar. 28, 2006

(65) Prior Publication Data

US 2007/0247093 A1   Oct. 25, 2007

(51) Int. Cl.
*H02K 7/14* (2006.01)
(52) U.S. Cl. ........................................ 310/67 R; 310/91
(58) Field of Classification Search .............. 310/67 R, 310/91, 254, 261, 71; 417/354
See application file for complete search history.

(56) References Cited

U.S. PATENT DOCUMENTS 2,742,223 A * 4/1956 Font ............................ 417/354
4,529,901 A * 7/1985 Bartell ........................ 310/90
5,982,061 A * 11/1999 Grantz et al. ............. 310/67 R
2004/0132360 A1 7/2004 Kabakov
2005/0113216 A1 5/2005 Cheng

* cited by examiner

*Primary Examiner*—Gary F. Paumen
(74) *Attorney, Agent, or Firm*—The Noblitt Group, PLLC

(57) ABSTRACT

The disclosed system, device and method for an electric motor generally includes a hollow shaft having a first end and a second end. An electromagnet is coupled to the hollow shaft, where the electromagnet is suitably configured to emit an electromagnetic field, and where the electromagnet is disposed between the first end and the second end of the hollow shaft. A drum substantially encases the electromagnet, where the drum is coupled to rotate about an axis of the hollow shaft in response to the electromagnetic field emitted by the electromagnet.

18 Claims, 3 Drawing Sheets

HOLLOW CORE ELECTRIC MOTOR

FIELD OF INVENTION

The present invention generally concerns electric motors, and more particularly, representative and exemplary embodiments of the present invention generally relate to systems, devices and methods relating to hollow-core electric motors.

BACKGROUND OF INVENTION

Electric motors are used in a wide variety of applications. For example, an Unmanned Aerial Vehicle (UAV) designed for reconnaissance applications may use an electric motor to drive a propeller assembly. The configuration of traditional electric motors may often limit the design options for certain applications. One example of this may be seen in traditional UAV designs where the electric motor is mounted on the front of the aircraft because control wiring may not be adequately run past the motor in order to position it at a mid-point of the aircraft fuselage. However, such designs for reconnaissance UAVs have the disadvantage that the rotation of the propellers often interferes with cameras and other sensor equipment. Thus, engineers are often relegated to positioning the sensor equipment away from the propeller.

An electric motor mounted on the front or rear of a UAV may present issues relating to counter-balance the aircraft to compensate for the weight of the electric motor being positioned at an extreme end. Such balancing is inherently more difficult than would be necessary for a motor suitably adapted to be mounted, for example, near a mid-point of the aircraft fuselage. Furthermore, a front or rear-mounted electric motor may be unable to deliver optimal thrust to the aerodynamic control surfaces of the aircraft as compared to a motor that could may mounted at a mid-point on the aircraft fuselage.

SUMMARY OF THE INVENTION

In various representative aspects, the present invention provides an electric motor having a hollow core. Exemplary features generally include a hollow shaft supporting an electromagnet and a drum. The drum may be suitably attached to propellers and may be suitably configured to provide propulsion for the aircraft by rotating about the axis of the hollow shaft in response to an electromagnetic field generated by the electromagnet.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Figure 2:
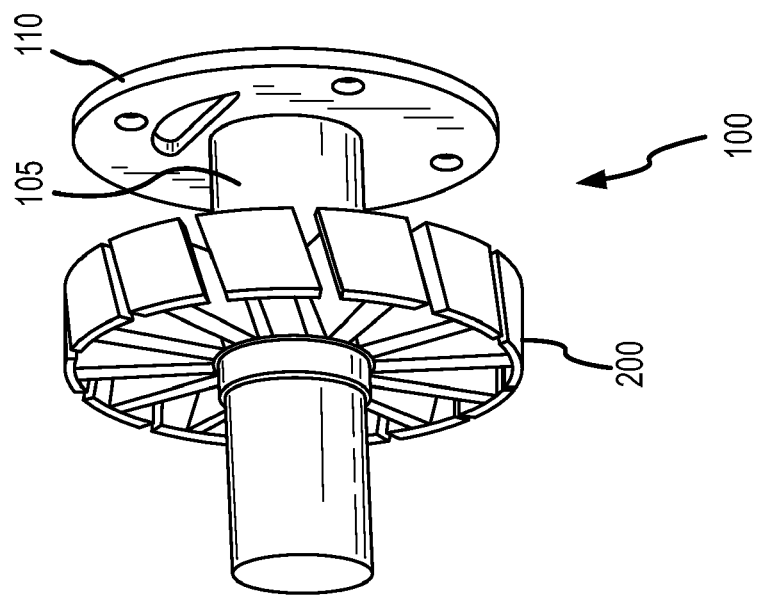
FIG. 2 representatively illustrates an isometric view of an electromagnet attached to a hollow shaft of an electric motor in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any hollow-core electric motor system. For example, certain representative implementations may include hollow-core electric motors used in applications such as aircraft engines.

As used herein, the terms "electromagnet", "magnet", "coil", "core" or any contextual variant or combination thereof, are generally intended to include anything that may be regarded as at least being susceptible to characterization as, or generally referring to, an electromagnet suitably adapted for use in an electric motor. A detailed description of an exemplary application, namely a hollow-core electric motor for use as an engine in an aircraft, is provided as a specific enabling disclosure that may be generalized to any application of the disclosed system, device and method for electric motors in accordance with various embodiments of the present invention.

Various representative and exemplary embodiments of the present invention generally provide a system and method for permitting objects to pass through an electric motor to allow the electric motor to be disposed anywhere within a vehicle, system, structure and/or device. It will be appreciated that additional features may be readily adapted, extended, or otherwise applied to future electric motor designs. Accordingly, it will be further understood that the present invention is more generally directed to the generic conceptual approach of implementing a hollow-core electric motor rather than merely disclosing specific module designs and/or combinatorial permutations.

Figure 1:
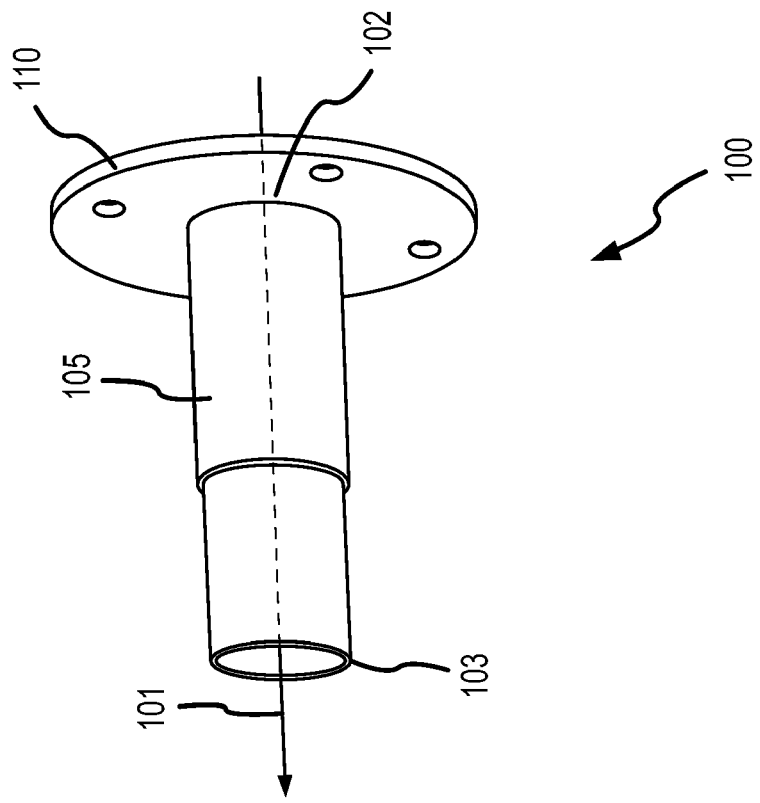
FIG. 1 representatively illustrates an isometric view of a hollow shaft of an electric motor in accordance with an exemplary embodiment of the present invention.

FIG. 1 representatively illustrates an isometric view of a hollow shaft 105 of an electric motor 100 in accordance with an exemplary embodiment of the present invention. As generally depicted in FIG. 1, an electric motor 100 according to various aspects of the present invention includes a hollow shaft 105 having an axis 101, a first end 102 and a second end 103. In a representative embodiment, first end 102 may be in the aft direction and the second end 103 may be in the forward direction of an aircraft or other air, land or waterborne vehicle powered by electric motor 100. In another exemplary embodiment, first end may be coupled to mounting bracket 110, where mounting bracket 110 may be used to couple electric motor 100 to a frame of an aircraft, land or waterborne vehicle.

Hollow shaft 105 may be implemented using any suitable material or combination of materials in any configuration to achieve any desired result. Hollow shaft 105 may also be fabricated using any suitable method of manufacture. For example, hollow shaft 105 may be cast from a mold, machined from a single piece of material and/or comprise components attached by weld, solder, fasteners and/or the like. The method of manufacturing hollow shaft 105 may be chosen based on any suitable criteria to achieve any desired result, such as casting hollow shaft 105 from a solid piece of steel to maximize strength, or machining hollow shaft 105 to ensure the diameter of hollow shaft 105 adequately accommodates wiring passing through electric motor 100.

In an exemplary embodiment, hollow shaft 105 may comprise a steel tube having walls of suitable thickness to resist the torque generated by electric motor 100. Alternatively, conjunctively or sequentially, hollow shaft 105 may comprise a composite material in order to enhance characteristics such as flexibility and durability. For example, in one embodiment, in accordance with various aspects of the present invention, electric motor 100 may be used to propel an unmanned aerial vehicle (UAV), and may have a hollow shaft 105 comprising a composite material in order to reduce the overall weight of the UAV and dissipate heat generated by electric motor 100 and the wiring or other instrumentalities passing through hollow shaft 105.

Hollow shaft 105 may be of any size, shape, configuration, geometry and/or symmetry. For example, hollow shaft 105 may be rectangular in order to interface with a rectangular mounting bracket, or tubular to accommodate a tubular-shaped structure, system, or device passing through electric motor 100. In another exemplary embodiment, hollow shaft 105 may be of a triangular configuration at one end and a tubular configuration at the other end in order to interface with appropriately-shaped mounting structures. The dimensions and configuration of hollow shaft 105 may be selected according to any suitable criteria, such as to minimize size and weight, to maximize strength and durability and/or to accommodate a particular structure, object and/or device.

Hollow shaft 105 may also include any other suitable features, structures, systems and/or devices to achieve any particular purpose. For example, hollow shaft 105 may include any suitable number of holes and/or void volumes in any configuration to allow heat to dissipate from inside hollow shaft 105 and/or to provide outlets for wiring or other objects passing through hollow shaft 105. Hollow shaft 105 may support multiple electric motors 100 for any purpose, such as to increase or counteract torque generated by the electric motors 100. Hollow shaft 105 may also accommodate any suitable propulsion system, such as a propeller, in order to, for example, reduce cavitation and wake and/or to increase efficiency and power of electric motor 100 in propelling a waterborne vehicle.

Hollow shaft 105 may suitably provide a conduit that allows any suitable structure, substance, system, device, particle of matter and/or object to pass through electric motor 100 for any suitable purpose. In a representative embodiment, for example, hollow shaft 105 of electric motor 100 in a UAV may be suitably adapted to allow air to pass through the shaft in order to be measured by an airspeed sensor. Hollow shaft 105 may also allow substances to pass through electric motor 100 for purposes of venting, cooling and/or transportation of the substance. Hollow shaft 105 may also provide a conduit through which light may pass, such as a laser used by a weapons system to designate and/or track target.

In one exemplary embodiment, hollow shaft 105 may allow structures such as cabling and wiring for the control systems of a UAV to pass through electric motor 100 to allow electric motor 100 to be mounted in a substantially medial portion of the UAV instead of the front or rear of the aircraft. In such an embodiment, mid-mounting of electric motor 100 may be accomplished to gain any suitable benefit, such as to reduce the amount of wiring needed to run to the control surfaces of the aircraft, as well as to increase the control response of the UAV over mounting electric motor 100 in the front of the UAV. Hollow shaft 105 may also allow other materials to pass through electric motor 100, such as heat-sink material suitably adapted to draw and transfer heat away from electric motor 100. Hollow shaft 105 may also allow placement of electric motor 100 in a vehicle to achieve any other suitable result, such as to balance the vehicle and reduce the proximity of electric motor 100 to other systems to avoid electromagnetic interference and/or to avoid interfering with another system such as a camera or other sensor mounted on the UAV.

FIG. 2 representatively illustrates an isometric view of an electromagnet 200 coupled to hollow shaft 105 of electric motor 100 in accordance with an exemplary embodiment of the present invention. In an exemplary embodiment, hollow shaft 105 may support the electromagnet 200 and allow objects, structures, devices and/or substances to pass through the electric motor 100. Electromagnet 200 may be mounted to hollow shaft 105 using screws, fasteners, adhesive and/or the like. Electromagnet 200 may be coupled between first end 102 and second end 103 of hollow shaft 105. In a representative embodiment, electromagnet 200 may be substantially medially disposed between first end 102 and second end 103 of hollow shaft.

Electromagnet 200 may suitably generate an electromagnetic field. Electromagnet 200 may comprise any suitable structure, system and device configured in any manner. For example, electromagnet 200 may comprise a core of any size, shape, configuration, geometry and/or symmetry. The core may be comprised any suitable combination of materials, for example a ferrous core and/or the like. In addition, electromagnet 200 may include any number of windings around the core. The windings may be of any suitable material of any size, shape, configuration, geometry and/or symmetry. In the present embodiment, for example, three separate windings may be wrapped around the teeth of the core in an alternating pattern to create a three-phase electromagnet.

Figure 3:
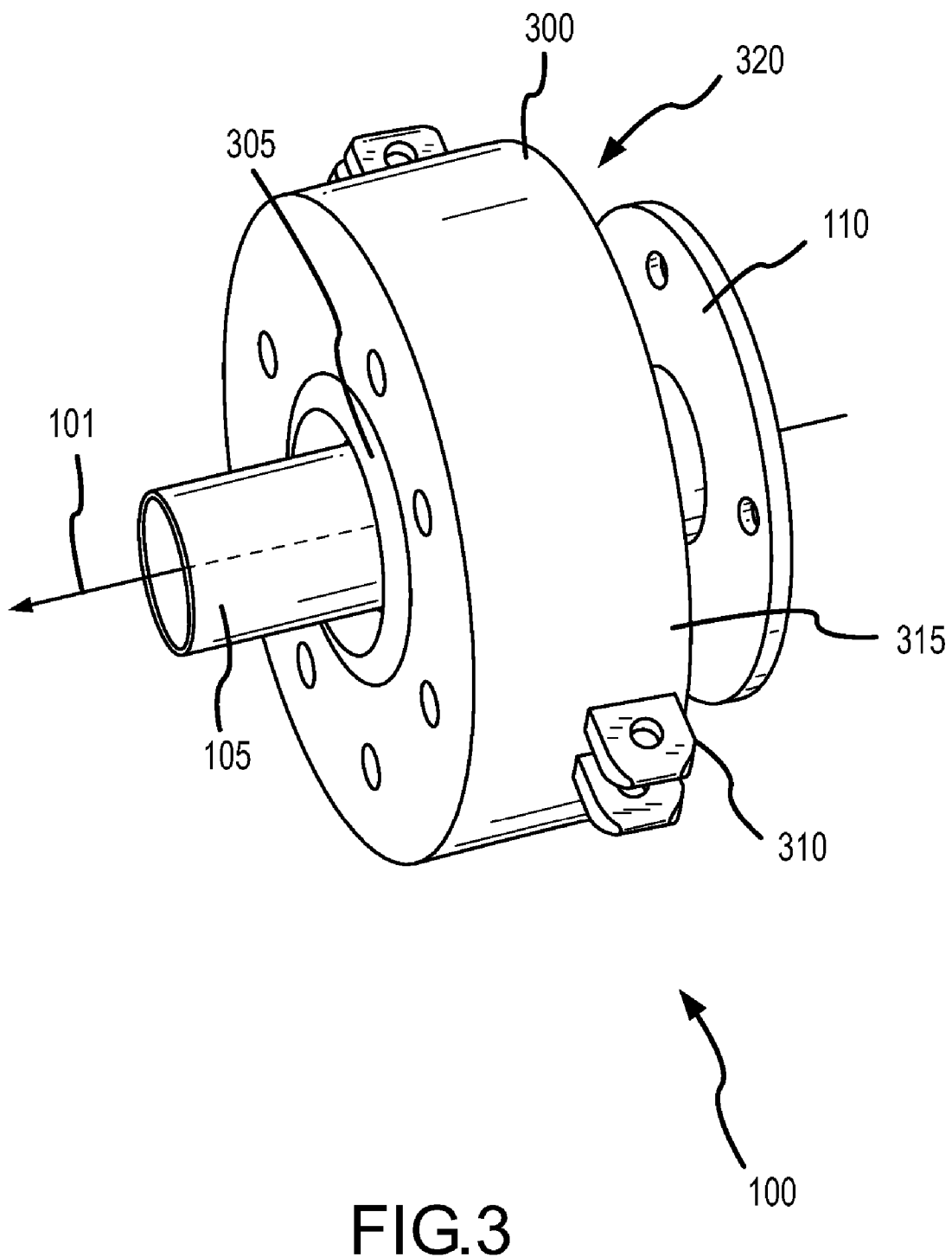
FIG. 3 representatively illustrates an isometric view of a drum substantially encasing an electromagnet of an electric motor in accordance with an exemplary embodiment of the present invention.

FIG. 3 representatively illustrates an isometric view of a drum 300 substantially encasing an electromagnet 200 of an electric motor 100 in accordance with an exemplary embodiment of the present invention. In a representative aspect, drum 300 may be coupled to rotate about the axis 101 of hollow shaft 105 in response to an electromagnetic field emitted by electromagnet 200. In an exemplary embodiment, drum 300 may comprise any suitable material for any suitable purpose. For example, drum 300 may comprise a metal alloy, composite and/or any combination thereof. Drum 300 may be cylindrical in shape, or any other shape that suits a given purpose.

In the present exemplary embodiment, drum 300 may comprise an interior portion 320 and an exterior portion 315. In a representative embodiment, interior portion 320 of drum 300 may include any number of magnets coupled to allow drum 300 to rotate in response to the magnetic field generated by electromagnet 200. Drum 300 may interact with electromagnet 200 in any suitable manner. In an exemplary aspect, electric motor 100 may include a power source coupled to the electromagnet 200 such as a battery, solar cell and/or the like. Electric motor 100 may also include a speed controller interposed between the power source and electromagnet 200 to variably supply electric current from the power source to electromagnet 200. Any means of varying the voltage and/or current applied to the electromagnet 200 may be used as a speed controller, an electronically controlled rheostat and/or the like.

For example and without limitation, magnets coupled to interior portion 320 of drum 300 may alternate between north and south poles. When the coil of electromagnet 200 is activated by a speed controller with power from a power source, the magnets coupled to interior portion 320 of drum 300 will attract and repel from the coil causing rotation of drum 300 about axis 101 of hollow shaft 105. The rotational velocity with which drum 300 rotates may correspond to the strength of the electromagnetic field generated by electromagnet 200, which may be varied, for example, in order to throttle the velocity of a electric motor 100. Additionally, the rotational direction drum 300 rotates may depend on the polarity of the magnetic field generated by electromagnet 200, and may be controlled via speed controller or a separate switch to reverse polarity.

In a representative embodiment, drum 300 may be supported about hollow shaft 105 using bearing assembly 305 or any other means of rotationally coupling drum 300 to hollow shaft 105. Bearing assembly 305 may, for example, be secured to hollow shaft 105 with a set screw, nut and bolt assembly and/or the like. Drum 300 may coupled to bearing assembly 305 such that drum 300 may rotate about electromagnet 200 substantially as described above.

Drum 300 may include one or more fasteners 310 coupled to exterior portion of drum 300. Fastener 310 may be suitably adapted to couple an object, device or assembly to drum 300 such that the object, device or assembly may be rotated at substantially the same rotational velocity as drum 300. For example and without limitation, fastener 310 may be a threaded nut and bolt assembly, clip, or any other means of attaching an object, device or assembly to drum 300.

Figure 4:
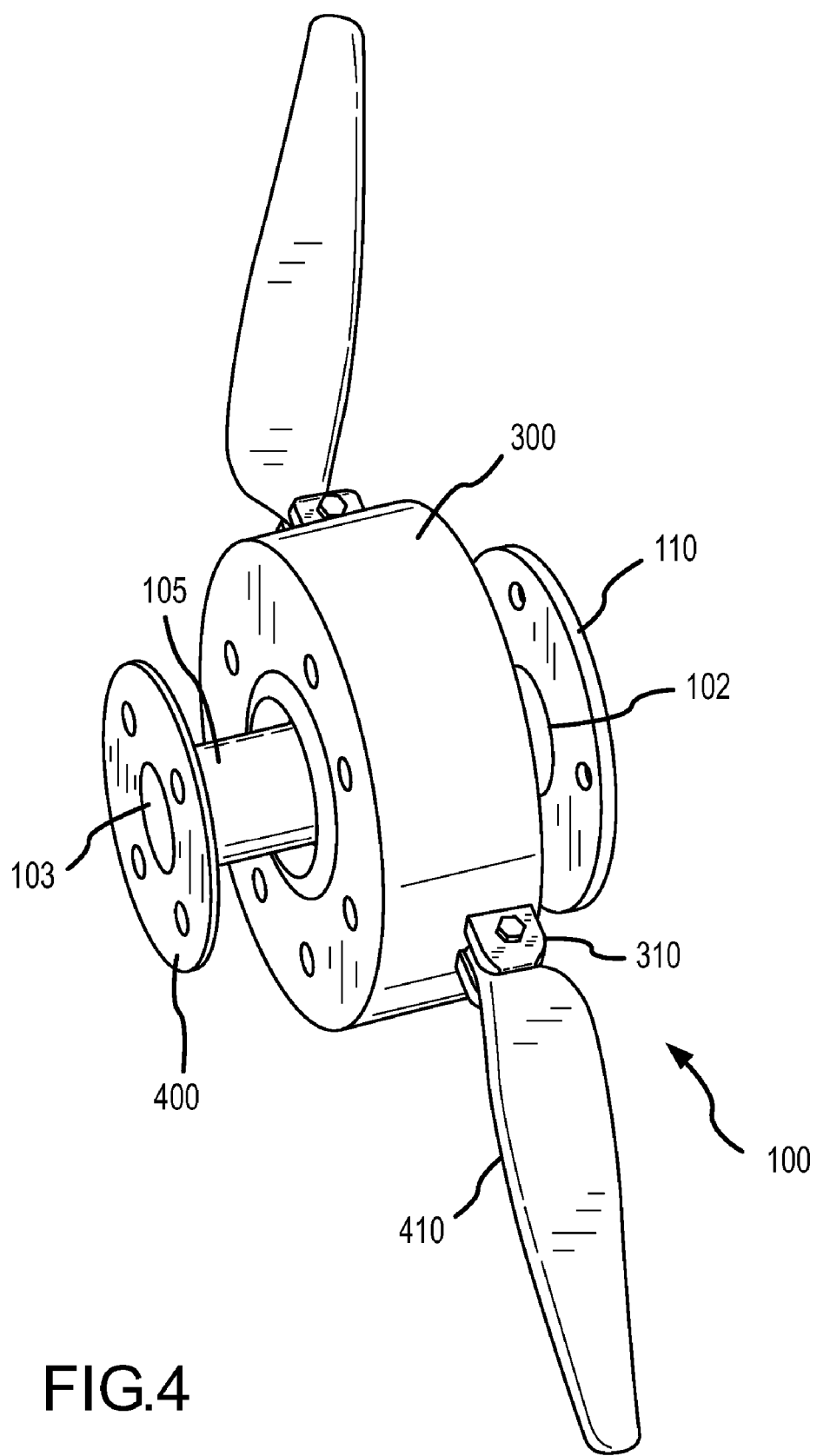
FIG. 4 representatively illustrates an isometric view of an electric motor assembly in accordance with another exemplary embodiment of the present invention.

FIG. 4 representatively illustrates an isometric view of a propeller 410 coupled to an electric motor 100 in accordance with an exemplary embodiment of the present invention. Fastener 310 coupled to exterior portion 315 of drum 300 may be coupled to one or more propellers 410 to provide propulsion for a waterborne vehicle or aerial vehicle, such as an UAV. A propeller 410 may be of any configuration, shape, size and/or symmetry. In the present embodiment, for example, propeller 410 may be pivotally coupled to fastener 310 and folded against exterior portion 315 of drum 300 in order to reduce the overall volume of a UAV. Any other suitable structures, objects, devices and/or systems may be suitably attached, connected, coupled and interfaced with drum 300.

Electric motor 100 may include a mounting collar 400 removably coupled to second end 103. Mounting collar 400 may be any shaped object that couples to second end 103 of hollow shaft 105 such that mounting bracket 110 and mounting collar 400 may suitably couple electric motor 100 to the fuselage of an air vehicle, water vehicle, land vehicle and/or the like. Mounting collar 400 may be secured to hollow shaft 105 using a set screw, nut and bolt assembly, or another fastener or device to secure mounting collar 400 to hollow shaft 105. For example, mounting bracket 110 and mounting collar 400 may be coupled to attach electric motor 100 to a UAV.

Electric motor 100 may be mounted to an aft portion of an air vehicle using mounting bracket 110. For example, mounting bracket 110, along with hollow shaft 105, electromagnet 200 and drum 300 may be coupled to the aft portion of an air vehicle and secured via mounting bracket 110. Mounting collar 400 may then be removably coupled to second end 103 of hollow shaft 105 as described vide supra with a forward portion of the air vehicle secured to mounting collar 400. The resulting air vehicle includes an electric motor 100 with a propeller mounted substantially in the middle of the air vehicle, which ameliorates the disadvantages of conventional air vehicles where the propeller is mounted in the forward or aft portion of the vehicle.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. An electric motor adapted to connect to a first structure and a second structure, comprising:
   a hollow shaft having a first end and a second end, wherein the hollow shaft:
      is configured to connect the first structure to the first end and the second structure to the second end; and
      defines a conduit from the first structure to the second structure for at least one of a connection for a sensor, a mechanical linkage, and a data link;
   an electromagnet coupled to the hollow shaft, wherein the electromagnet is disposed between the first end and the second end; and
   a drum substantially encasing the electromagnet, wherein the drum is coupled to rotate about an axis of the hollow shaft in response to the electromagnetic field emitted by the electromagnet.

2. The electric motor of claim 1, further comprising:
   a power source; and
   a speed controller coupled to the electromagnet and the power source, wherein the speed controller is coupled to variably supply electric current from the power source to the electromagnet to control rotation of the drum about the axis.

3. The electric motor of claim 1, wherein each of the first and second end of the hollow shaft further comprises at least one of:
   a flange;
   a mounting bracket; and
   a mounting collar.

4. The electric motor of claim 3, wherein the mounting collar is removably coupled to the second end, and wherein the first end is coupled to the mounting bracket.

5. The electric motor of claim 1, further comprising a bearing assembly, wherein the bearing assembly is coupled to support the drum about the hollow shaft.

6. The electric motor of claim 1, wherein the drum further comprises a fastener suitably configured to couple a propeller to the drum.

7. The electric motor of claim 1, wherein the electromagnet comprises:
   a ferrous core; and
   a winding wrapped around the ferrous core.

8. An electric motor for connecting a first fuselage section including a first bulkhead of an air vehicle to a second fuselage section including a second bulkhead of the air vehicle, said electric motor comprising:
   a hollow shaft having a first end and a second end, wherein the hollow shaft defines a conduit from the first fuselage section of the air vehicle to the second fuselage section of the air vehicle for at least one of a connection for a sensor, a mechanical linkage, and a data link;
   a mounting bracket coupled to the first end, wherein the mounting bracket is configured to attach to the first bulkhead of the first fuselage section of the air vehicle;
   a mounting collar removably coupled to the second end, wherein the mounting collar is configured to attach to the second bulkhead of the second fuselage section of the air vehicle;
   an electromagnet coupled to the hollow shaft, wherein the electromagnet is disposed between the first end and the second end;
   a drum substantially encasing the electromagnet, comprising:
      an interior portion;
      an exterior portion;
      at least one fastener coupled to the exterior portion;
      at least one magnet coupled to the interior portion, wherein the drum is configured to rotate about the hollow shaft in response to the electromagnetic field generated by the electromagnet; and
   at least one propeller coupled to the fastener.

9. The electric motor of claim 8, further comprising:
   a power source; and
   a speed controller coupled to the electromagnet and the power source, wherein the speed controller is coupled to variably supply electric current from the power source to the electromagnet to control a rotational velocity of the drum.

10. The electric motor of claim 8, further comprising a bearing assembly, wherein the bearing assembly is coupled to support the drum about the hollow shaft.

11. The electric motor of claim 8, wherein the propeller is pivotally coupled to the fastener.

12. The electric motor of claim 8, wherein the propeller is coupled to pivot in relation to the hollow shaft.

13. A method for providing a medially-disposed conduit path through an electric motor between a first structure having an aft end and a second structure having a forward end, said method comprising:
   providing a hollow shaft having a first end and a second end, wherein the hollow shaft is configured to:
      connect the first structure to the second structure; and
      define a conduit from the aft end of the first structure to the forward end of the second structure for at least one of a connection for a sensor a mechanical linkage and a data link;
   providing an electromagnet coupled to the hollow shaft, wherein the electromagnet is disposed between the first end and the second end; and
   providing a drum substantially encasing the electromagnet, wherein the drum is coupled to rotate about an axis of the hollow shall in response to the electromagnetic field emitted by the electromagnet.

14. The method of claim 13, further comprising the steps of:
   providing a power source; and
   providing a speed controller coupled to the electromagnet and the power source, wherein the speed controller is coupled to variably supply electric current from the power source to the electromagnet to control a rotational velocity of the drum about the axis.

15. The method of claim 13, wherein at least one of a mounting flange, a mounting bracket, and a mounting collar is attached to each of the first and second end.

16. The method of claim 13, wherein the step of coupling the drum to rotate about the axis of the hollow shaft comprises the step of providing a bearing assembly supporting the drum about the hollow shaft.

17. The method of claim 13, wherein the step of providing the drum further comprises providing a fastener coupled to the drum, wherein the fastener is suitably configured to couple the drum to a propeller.

18. The method of claim 13, wherein the step of providing the electromagnet comprises:
   providing a ferrous core; and
   providing a winding wrapped around the ferrous core.

* * * * *